United States Patent
Kim et al.

(10) Patent No.: US 10,373,023 B1
(45) Date of Patent: Aug. 6, 2019

(54) LEARNING METHOD AND LEARNING DEVICE FOR RUNTIME INPUT TRANSFORMATION OF REAL IMAGE ON REAL WORLD INTO VIRTUAL IMAGE ON VIRTUAL WORLD, TO BE USED FOR OBJECT DETECTION ON REAL IMAGES, BY USING CYCLE GAN CAPABLE OF BEING APPLIED TO DOMAIN ADAPTATION

(71) Applicant: Stradvision, Inc., Gyeongbuk (KR)

(72) Inventors: Kye-Hyeon Kim, Seoul (KR); Yongjoong Kim, Gyeongsangbuk-do (KR); Insu Kim, Gyeongsangbuk-do (KR); Hak-Kyoung Kim, Gyeongsangbuk-do (KR); Woonhyun Nam, Gyeongsangbuk-do (KR); SukHoon Boo, Gyeonggi-do (KR); Myungchul Sung, Gyeongsangbuk-do (KR); Donghun Yeo, Gyeongsangbuk-do (KR); Wooju Ryu, Gyeongsangbuk-do (KR); Taewoong Jang, Seoul (KR); Kyungjoong Jeong, Gyeongsangbuk-do (KR); Hongmo Je, Gyeongsangbuk-do (KR); Hojin Cho, Gyeongsangbuk-do (KR)

(73) Assignee: Stradvision, INC., Gyeongbuk (KR)

( * ) Notice: Subject to any disclaimer, the term of this patent is extended or adjusted under 35 U.S.C. 154(b) by 0 days.

(21) Appl. No.: 16/258,877

(22) Filed: Jan. 28, 2019

(51) Int. Cl.
*G06K 9/00* (2006.01)
*G06K 9/62* (2006.01)
(Continued)

(52) U.S. Cl.
CPC ............ *G06K 9/6257* (2013.01); *G06F 17/11* (2013.01); *G06N 3/0454* (2013.01); *G06T 7/246* (2017.01);
(Continued)

(58) Field of Classification Search
CPC ....... G06K 9/6257; G06T 7/246; G06T 15/10; G06T 19/006; G06T 2207/20081; G06F 17/11; G06N 3/0454
See application file for complete search history.

(56) References Cited

U.S. PATENT DOCUMENTS

| 2018/0239951 A1* | 8/2018 | El-Zehiry | ........... G06K 9/00147 |
| 2019/0035118 A1* | 1/2019 | Zhao | ..................... G06T 3/4046 |
| 2019/0080206 A1* | 3/2019 | Hotson | ................ G06K 9/6264 |

* cited by examiner

*Primary Examiner* — Shefali D Goradia
(74) *Attorney, Agent, or Firm* — FisherBroyles, LLP; Susan M. Oiler

(57) ABSTRACT

A method for learning a runtime input transformation of real images into virtual images by using a cycle GAN capable of being applied to domain adaptation is provided. The method can be also performed in virtual driving environments. The method includes steps of: (a) (i) instructing first transformer to transform a first image to second image, (ii-1) instructing first discriminator to generate a 1_1-st result, and (ii-2) instructing second transformer to transform the second image to third image, whose characteristics are same as or similar to those of the real images; (b) (i) instructing the second transformer to transform a fourth image to fifth image, (ii-1) instructing second discriminator to generate a 2_1-st result, and (ii-2) instructing the first transformer to transform the fifth image to sixth image; (c) calculating losses. By the method, a gap between virtuality and reality can be reduced, and annotation costs can be reduced.

24 Claims, 4 Drawing Sheets

(51) Int. Cl.
*G06T 7/246* (2017.01)
*G06N 3/04* (2006.01)
*G06T 15/10* (2011.01)
*G06F 17/11* (2006.01)
*G06T 19/00* (2011.01)

(52) U.S. Cl.
CPC ............ *G06T 15/10* (2013.01); *G06T 19/006* (2013.01); *G06T 2207/20081* (2013.01)

LEARNING METHOD AND LEARNING DEVICE FOR RUNTIME INPUT TRANSFORMATION OF REAL IMAGE ON REAL WORLD INTO VIRTUAL IMAGE ON VIRTUAL WORLD, TO BE USED FOR OBJECT DETECTION ON REAL IMAGES, BY USING CYCLE GAN CAPABLE OF BEING APPLIED TO DOMAIN ADAPTATION

FIELD OF THE DISCLOSURE

The present disclosure relates to a learning method and a learning device, a testing method and a testing device for use with an autonomous vehicle, virtual driving, and the like; and more particularly, to the learning method and the learning device for learning transformation of real images on a real world into virtual images on a virtual world by using a cycle GAN, and the testing method and the testing device using the same.

BACKGROUND OF THE DISCLOSURE

Deep Convolution Neural Networks (Deep CNNs) are at the heart of the remarkable development in deep learning. CNNs have already been used in the 90's to solve problems of character recognition, but their use has become as widespread as it is now thanks to recent researches. These CNNs won the 2012 ImageNet image classification tournament, crushing other competitors. Then, the CNNs became a very useful tool in the field of machine learning.

Recently, the CNNs have been popular in an autonomous vehicles industry. When used in the autonomous vehicles industry, the CNNs perform functions of acquiring images from a camera installed on a vehicle, searching for lanes, etc. In order to perform these functions, the CNNs learn parameters by using training images on a real world and their corresponding GTs. Shortcoming of this kind of a traditional approach is that acquiring training images on a real world and generating their corresponding GTs should be done by people, not automatically by a programmed computer, resulting in high cost on training processes.

An alternative approach for training the CNNs is using virtual images on a virtual world simulated by a programmed computer. Herein, the virtual images and their corresponding GTs can be acquired automatically by the programmed computer, resulting in much lower cost on training processes, comparing to the traditional approach.

However, a shortcoming of this alternative approach is that the CNNs learn parameters by using the virtual images, resulting in degradation of a performance on detecting objects included in real images on the real world, whose characteristics are slightly different from those of the virtual images.

SUMMARY OF THE DISCLOSURE

It is an object of the present disclosure to solve all the aforementioned problems.

It is another object of the present disclosure to provide a method for allowing object detectors learned by using virtual images on a virtual world to detect objects included in real images on a real world by transforming the real images into the virtual images through a transformer having been learned by using GAN.

In accordance with one aspect of the present disclosure, there is provided a learning method for learning transformation of one or more real images on a real world into one or more virtual images on a virtual world by using a cycle GAN (Generative Adversarial Network), including steps of: (a) if at least one first image, which is one of the real images, is acquired, (i) instructing a first transformer to transform the first image to at least one second image, whose one or more characteristics are same as or similar to those of the virtual images, (ii-1) instructing a first discriminator to determine whether the second image is one of primary virtual images or one of secondary virtual images, wherein the primary virtual images are at least part of the virtual images without a transformation from at least part of the real images, and the secondary virtual images are at least part of the virtual images with the transformation from at least part of the real images, to thereby generate a 1_1-st result, and (ii-2) instructing a second transformer to transform the second image to at least one third image, whose one or more characteristics are same as or similar to those of the real images; (b) if at least one fourth image, which is one of the virtual images, is acquired, (i) instructing the second transformer to transform the fourth image to at least one fifth image, whose one or more characteristics are same as or similar to those of the real images, (ii-1) instructing a second discriminator to determine whether the fifth image is one of primary real images or one of secondary real images, wherein the primary real images are at least part of the real images without a transformation from at least part of the virtual images, and the secondary real images are at least part of the real images with the transformation from at least part of the virtual images, to thereby generate a 2_1-st result, and (ii-2) instructing the first transformer to transform the fifth image to at least one sixth image, whose one or more characteristics are same as or similar to those of the virtual images; and (c) calculating one or more losses by referring to at least part of the first image, the second image, the third image, the fourth image, the fifth image, the sixth image, the 1_1-st result, and the 2_1-st result, to thereby learn at least part of parameters of the first transformer, the second transformer, the first discriminator, and the second discriminator.

As one example, at the step of (c), $$G^*=\operatorname{argmin}(\log(1-D_G(G(I))+\gamma|I-F(G(I))|+\log(1-D_F(F(X)))+\beta|X-G(F(X))|)$$

a transformer loss included in said one or more losses is defined by a formula above, I is the first image, G(I) is the second image, $D_G(G(I))$ is the 1_1-st result, F(G(I)) is the third image, X is the fourth image, F(X) is the fifth image, $D_F(F(X))$ is the 2_1-st result, G(F(X)) is the sixth image, $\gamma$ and $\beta$ are constants for adjusting each of weights of each of $|I-F(G(I))|$ and $|X-G(F(X))|$.

As one example, at the step of (c), the learning device, if (i) a virtual object detection result on at least part of the second image and the sixth image generated by a virtual object detector, which detects at least one virtual object included in its inputted image, and (ii) its corresponding GT are acquired, instructs a loss unit to generate at least part of said one or more losses by further referring to the virtual object detection result.

As one example, at the step of (c), $$G^*=\operatorname{argmin}(\log(1-D_G(G(I))+\gamma|I-F(G(I))|+\log(1-D_F(F(X)))+\beta|X-G(F(X))|)+\operatorname{argmax}(\lambda_1 \times OD(G(I))+\lambda_2 \times OD(G(F(X)))))$$

a transformer loss included in said one or more losses is defined by a formula above, I is the first image, G(I) is the second image, $D_G(G(I))$ is the 1_1-st result, F(G(I)) is the third image, X is the fourth image, F(X) is the fifth image, $D_F(F(X))$ is the 2_1-st result, G(F(X)) is the sixth image, $\gamma$ and β are constants for adjusting each of weights of each of |I−F(G(I))| and |X−G(F(X))|, and argmax($\lambda_1$×OD(G(I))+$\lambda_2$×OD(G(F(X)))) is a partial loss of the transformer loss, corresponding to the virtual object detection result, $\lambda_1$ and $\lambda_2$ are constants for adjusting each of weights of each of OD(G(I)) and OD (G(F(X))).

As one example, at the step of (c), $$D_G^* = \text{argmax}(\log(D_G(VI)) + \log(1 - D_G(G(I))))$$

an FD loss for the first discriminator included in the losses is defined by a formula above, VI is any arbitrary virtual image among the virtual images, $D_G(VI)$ is a 1_2-nd result, from the first discriminator, of determining the arbitrary virtual image, G(I) is the second image, and $D_G(G(I))$ is the 1_1-st result.

As one example, at the step of (c), $$D_F^* = \text{argmax}(\log(D_F(RI)) + \log(1 - D_F(F(X))))$$

an SD loss for the second discriminator included in the losses is defined by a formula above, RI is any arbitrary real image among the real images, $D_F(RI)$ is a 2_2-nd result, from the second discriminator, of determining the arbitrary real image, F(X) is the fifth image, and $D_F(F(X))$ is the 2_1-st result.

As one example, each of the first transformer and the second transformer includes at least part of one or more encoding layers and one or more decoding layers.

As one example, (i) at least part of first parameters included in (i-1) one or more first specific encoding layers, which are at least part of first encoding layers included in the first transformer and (i-2) one or more first specific decoding layers, which are at least part of first decoding layers included in the first transformer, and (ii) at least part of second parameters included in (ii-1) one or more second specific encoding layers, which are at least part of second encoding layers included in the second transformer and (ii-2) one or more second specific decoding layers, which are at least part of second decoding layers included in the second transformer, are learned relatedly, to thereby allow a degree of relationship between the first parameters and the second parameters to be larger than a threshold value.

As one example, the first specific encoding layers and the first specific decoding layers are selected among the first encoding layers and the first decoding layers respectively such that one or more first distances from a first latent space, located between the first encoding layer and the first decoding layers, are smaller than a first threshold distance, and the second specific encoding layers and the second specific decoding layers are selected among the second encoding layers and the second decoding layers respectively such that one or more second distances from a second latent space, located between the second encoding layer and the second decoding layers, are smaller than a second threshold distance.

In accordance with another aspect of the present disclosure, there is provided a testing method for testing transformation of one or more real images for testing on a real world into one or more virtual images for testing on a virtual world by using a cycle GAN (Generative Adversarial Network), including a step of: on condition that (1) a learning device (i) has instructed a first transformer to transform at least one first training image, which is one of real images for training, to at least one second training image, whose one or more characteristics are same as or similar to those of one or more virtual images for training, (ii-1) has instructed a first discriminator to determine whether the second training image is one of primary virtual images or one of secondary virtual images, wherein the primary virtual images are at least part of the virtual images for training without a transformation from at least part of the real images for training and the secondary virtual images are at least part of the virtual images for training with the transformation from at least part of the real images for training to thereby generate a 1_1-st result, and (ii-2) has instructed a second transformer to transform the second training image to at least one third training image, whose one or more characteristics are same as or similar to those of the real images for training, (2) the learning device (i) has instructed the second transformer to transform at least one fourth training image, which is one of the virtual images for training, to at least one fifth training image, whose one or more characteristics are same as or similar to those of the real images for training, (ii-1) has instructed a second discriminator to determine whether the fifth training image is one of primary real images or one of secondary real images, wherein the primary real images are at least part of the real images for training without a transformation from at least part of the virtual images for training, and the secondary real images are at least part of the real images for training with the transformation from at least part of the virtual images for training, to thereby generate a 2_1-st result, and (ii-2) has instructed the first transformer to transform the fifth training image to at least one sixth training image, whose one or more characteristics are same as or similar to those of the virtual images for training, and (3) the learning device has calculated one or more losses by referring to at least part of the first training image, the second training image, the third training image, the fourth training image, the fifth training image, the sixth training image, the 1_1-st result, and the 2_1-st result, to thereby learn at least part of parameters of the first transformer, the second transformer, the first discriminator, and the second discriminator; a testing device instructing the first transformer to acquire at least one test image, which is one of the real images for testing, and to transform the test image into at least one transformed test image, whose one or more characteristics are same as or similar to those of the virtual images for testing.

As one example, the transformed test image is used for fine-tuning of parameters included in a virtual object detector.

As one example, the test image is one of the real images for testing acquired by a camera included in an autonomous vehicle, and a virtual object detector included in the autonomous vehicle detects at least one object included in the transformed test image to thereby support the autonomous vehicle to drive in the real world.

In accordance with still another aspect of the present disclosure, there is provided a learning device for learning transformation of one or more real images on a real world into one or more virtual images on a virtual world by using a cycle GAN (Generative Adversarial Network), including: at least one memory that stores instructions; and at least one processor configured to execute the instructions to: perform processes of (I) if at least one first image, which is one of the real images is acquired, (i) instructing a first transformer to transform the first image to at least one second image, whose one or more characteristics are same as or similar to those of the virtual images, (ii-1) instructing a first discriminator to determine whether the second image is one of primary virtual images or one of secondary virtual images, wherein the primary virtual images are at least part of the virtual images without a transformation from at least part of the real images, and the secondary virtual images are at least part of the virtual images with the transformation from at least part of the real images, to thereby generate a 1_1-st result, and (ii-2) instructing a second transformer to transform the second image to at least one third image, whose one or more characteristics are same as or similar to those of the real images, (II) if at least one fourth image, which is one of the virtual images is acquired, (i) instructing the second transformer to transform the fourth image to at least one fifth image, whose one or more characteristics are same as or similar to those of the real images, (ii-1) instructing a second discriminator to determine whether the fifth image is one of primary real images or one of secondary real images, wherein the primary real images are at least part of the real images without a transformation from at least part of the virtual images, and the secondary real images are at least part of the real images with the transformation from at least part of the virtual images, to thereby generate a 2_1-st result, and (ii-2) instructing the first transformer to transform the fifth image to at least one sixth image, whose one or more characteristics are same as or similar to those of the virtual images, and (III) calculating one or more losses by referring to at least part of the first image, the second image, the third image, the fourth image, the fifth image, the sixth image, the 1_1-st result, and the 2_1-st result, to thereby learn at least part of parameters of the first transformer, the second transformer, the first discriminator, and the second discriminator.

As one example, at the process of (III), $$G^* = \operatorname{argmin}(\log(1-D_G(G(I))+\gamma|I-F(G(I))|+ \log(1-D_F(F(X)))+\beta|X-G(F(X))|)$$

a transformer loss included in said one or more losses is defined by a formula above, I is the first image, G(I) is the second image, $D_G(G(I))$ is the 1_1-st result, F(G(I)) is the third image, X is the fourth image, F(X) is the fifth image, $D_F(F(X))$ is the 2_1-st result, G(F(X)) is the sixth image, γ and β are constants for adjusting each of weights of each of |I−F(G(I))| and |X−G(F(X))|.

As one example, at the process of (DI), the processor, if (i) a virtual object detection result on at least part of the second image and the sixth image generated by a virtual object detector, which detects at least one virtual object included in its inputted image, and (ii) its corresponding GT are acquired, instructs a loss unit to generate at least part of said one or more losses by further referring to the virtual object detection result.

As one example, at the process of (DI), $$G^* = \operatorname{argmin}(\log(1-D_G(G(I)))+\gamma|I-F(G(I))|+ \log(1-D_F(F(X)))+\beta|X-G(F(X))|+ \operatorname{argmax}(\lambda_1 \times OD(G(I))+\lambda_2 \times OD(G(F(X)))))$$

a transformer loss included in said one or more losses is defined by a formula above, I is the first image, G(I) is the second image, $D_G(G(I))$ is the 1_1-st result, F(G(I)) is the third image, X is the fourth image, F(X) is the fifth image, $D_F(F(X))$ is the 2_1-st result, G(F(X)) is the sixth image, γ and β are constants for adjusting each of weights of each of |I−F(G(I))| and |X−G(F(X))|, and argmax($\lambda_1 \times OD(G(I))+\lambda_2 \times OD(G(F(X)))$) is a partial loss of the transformer loss, corresponding to the virtual object detection result, $\lambda_1$ and $\lambda_2$ are constants for respectively adjusting weights of OD(G(I)) and OD(G(F(X))).

As one example, at the process of (DI), $$D_G^* = \operatorname{argmax}(\log(D_G(VI))+\log(1-D_G(G(I))))$$

an FD loss for the first discriminator included in the losses is defined by a formula above, VI is any arbitrary virtual image among the virtual images, $D_G(VI)$ is a 1_2-nd result, from the first discriminator, of determining the arbitrary virtual image, G(I) is the second image, and $D_G(G(I))$ is the 1_1-st result.

As one example, at the process of (DI), $$D_F^* = \operatorname{argmax}(\log(D_F(RI))+\log(1-D_F(F(X))))$$

an SD loss for the second discriminator included in the losses is defined by a formula above, RI is any arbitrary real image among the real images, $D_F(RI)$ is a 2_2-nd result, from the second discriminator, of determining the arbitrary real image, F(X) is the fifth image, and $D_F(F(X))$ is the 2_1-st result.

As one example, each of the first transformer and the second transformer includes at least part of one or more encoding layers and one or more decoding layers.

As one example, (i) at least part of first parameters included in (i-1) one or more first specific encoding layers, which are at least part of first encoding layers included in the first transformer and (i-2) one or more first specific decoding layers, which are at least part of first decoding layers included in the first transformer, and (ii) at least part of second parameters included in (ii-1) one or more second specific encoding layers, which are at least part of second encoding layers included in the second transformer and (ii-2) one or more second specific decoding layers, which are at least part of second decoding layers included in the second transformer, are learned relatedly, to thereby allow a degree of relationship between the first parameters and the second parameters to be larger than a threshold value.

As one example, the first specific encoding layers and the first specific decoding layers are selected among the first encoding layers and the first decoding layers respectively such that one or more first distances from a first latent space, located between the first encoding layer and the first decoding layers, are smaller than a first threshold distance, and the second specific encoding layers and the second specific decoding layers are selected among the second encoding layers and the second decoding layers respectively such that one or more second distances from a second latent space, located between the second encoding layer and the second decoding layers, are smaller than a second threshold distance.

In accordance with still yet another aspect of the present disclosure, there is provided a testing device for testing transformation of one or more real images for testing on a real world into one or more virtual images for testing on a virtual world by using a cycle GAN (Generative Adversarial Network), including: at least one memory stores instructions; and at least one processor, on condition that a learning device, (1)(i) has instructed a first transformer to transform at least one first training image, which is one of real images for training, to at least one second training image, whose one or more characteristics are same as or similar to those of one or more virtual images for training, (ii-1) has instructed a first discriminator to determine whether the second training image is one of primary virtual images or one of secondary virtual images, wherein the primary virtual images are at least part of the virtual images for training without a transformation from at least part of the real images for training, and the secondary virtual images are at least part of the virtual images for training with the transformation from at least part of the real images for training, to thereby generate a 1_1-st result, and (ii-2) has instructed a second transformer to transform the second training image to at least one third training image, whose one or more characteristics are same as or similar to those of the real images for training, (2) the learning device (i) has instructed the second transformer to transform at least one fourth training image, which is one of the virtual images for training, to at least one fifth training image, whose one or more characteristics are same as or similar to those of the real images for training, (ii-1) has instructed a second discriminator to determine whether the fifth training image is one of primary real images or one of secondary real images, wherein the primary real images are at least part of the real images for training without a transformation from at least part of the virtual images for training, and the secondary real images are at least part of the real images for training with the transformation from at least part of the virtual images for training, to thereby generate a 2_1-st result, and (ii-2) has instructed the first transformer to transform the fifth training image to at least one sixth training image, whose one or more characteristics are same as or similar to those of the virtual images for training, and (3) the learning device has calculated one or more losses by referring to at least part of the first training image, the second training image, the third training image, the fourth training image, the fifth training image, the sixth training image, the 1_1-st result, and the 2_1-st result, to thereby learn at least part of parameters of the first transformer, the second transformer, the first discriminator, and the second discriminator; configured to execute the instructions to: perform a process of instructing the first transformer to acquire at least one test image, which is one of the real images for testing, and instructing the first transformer to transform the test image into at least one transformed test image, whose one or more characteristics are same as or similar to those of the virtual images for testing.

As one example, the transformed test image is used for fine-tuning of parameters included in a virtual object detector.

As one example, the test image is one of the real images for testing acquired by a camera included in an autonomous vehicle, and a virtual object detector included in the autonomous vehicle detects at least one object included in the transformed test image to thereby support the autonomous vehicle to drive in the real world.

In addition, recordable media that are readable by a computer for storing a computer program to execute the method of the present disclosure is further provided.

BRIEF DESCRIPTION OF THE DRAWINGS

The above and other objects and features of the present disclosure will become apparent from the following description of preferred embodiments given in conjunction with the accompanying drawings.

The following drawings to be used to explain example embodiments of the present disclosure are only part of example embodiments of the present disclosure and other drawings can be obtained base on the drawings by those skilled in the art of the present disclosure without inventive work.

DETAILED DESCRIPTION

Figure 1:
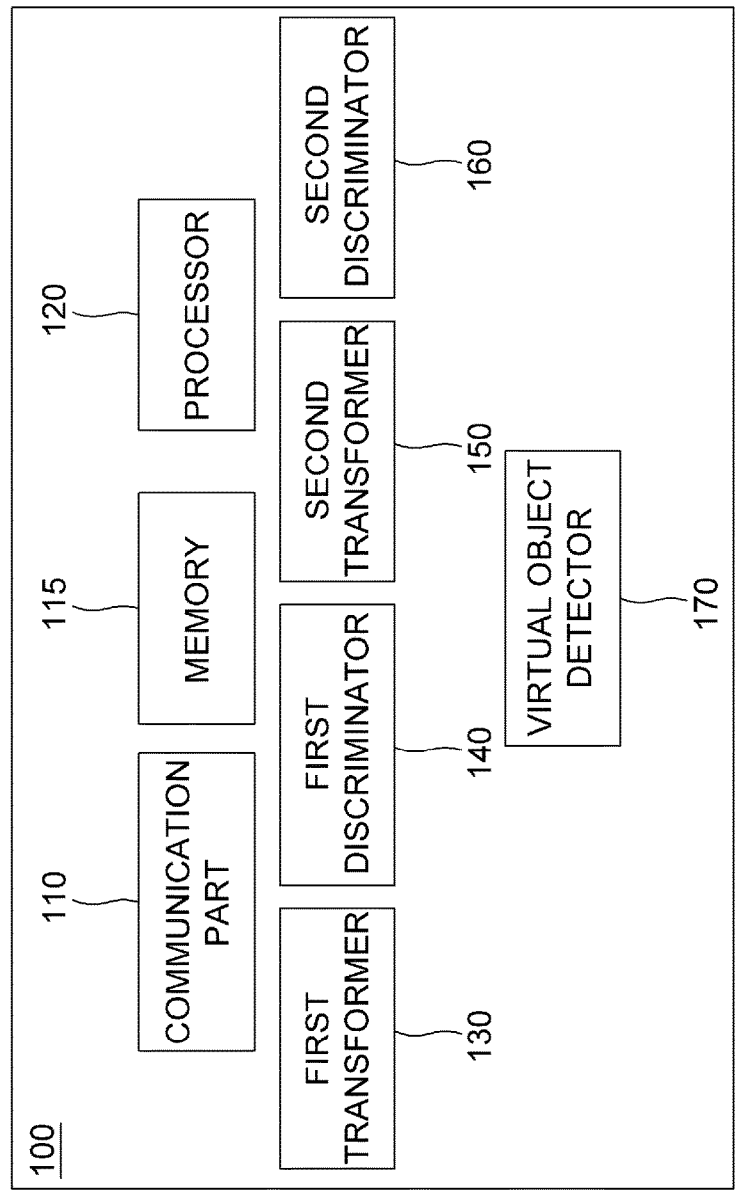
FIG. 1 is a drawing schematically illustrating a learning device performing a learning method for transforming real images into virtual images by using a cycle GAN (Generative Adversarial Network) in accordance with one example embodiment of the present disclosure.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the disclosure.

Besides, in the detailed description and claims of the present disclosure, a term "include" and its variations are not intended to exclude other technical features, additions, components or steps. Other objects, benefits, and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

To allow those skilled in the art to the present disclosure to be carried out easily, the example embodiments of the present disclosure by referring to attached diagrams will be explained in detail as shown below.

FIG. 1 is a drawing schematically illustrating a learning device performing a learning method for transforming real images into virtual images by using a cycle GAN (Generative Adversarial Network) in accordance with one example embodiment of the present disclosure.

By referring to FIG. 1, the learning device 100 may include a first transformer 130, a first discriminator 140, a second transformer 150, a second discriminator 160, and a virtual object detector 170, which are components to be described later. Processes of input/output and computation of the first transformer 130, the first discriminator 140, the second transformer 150, the second discriminator 160, and the virtual object detector 170 may be respectively performed by a communication part 110 and a processor 120. However, detailed communication schematics between the communication part 110 and the processor 120 is omitted in FIG. 1. Herein, a memory 115 may have stored various instructions to be described later, and the processor 120 may execute the instructions stored in the memory 115 and may perform processes of the present disclosure by executing the processes to be disclosed later. Such description of the learning device 100 does not exclude an integrated device including any combination of a processor, a memory, a medium, or any other computing components.

Herein, the first transformer 130 and the second transformer 150 may respectively transform characteristics of its inputted image. Specifically, the first transformer 130 may transform at least one first input image, which is one of real images on a real world, into at least one first output image, whose one or more characteristics are same as or similar to those of virtual images on a virtual world. And, the second transformer 150 may transform at least one second input image, which is one of the virtual images, into at least one second output image, whose one or more characteristics are same as or similar to those of the real images.

Herein, the one or more characteristics of the virtual images may include (i) a higher chroma, (ii) a higher contrast, (iii) relatively omitted details of objects, and (iv) relatively simple, unrealistic routes of rays. Example of these virtual images may be seen in open world games such as Gran Turismo series, Forza motorsports series and GTA series. However, the scope of the present disclosure is not limited thereto.

The one or more characteristics of the real images may include opposite characteristics, such as (i) a lower chroma, (ii) a lower contrast, (iii) relatively sufficient details of objects, (iv) relatively sophisticated, realistic routes of rays. Also, the scope of the present disclosure is not limited thereto. Below, in order to explain configurations of the first transformer 130 and the second transformer 150, FIG. 2 will be referred to.

Figure 2:
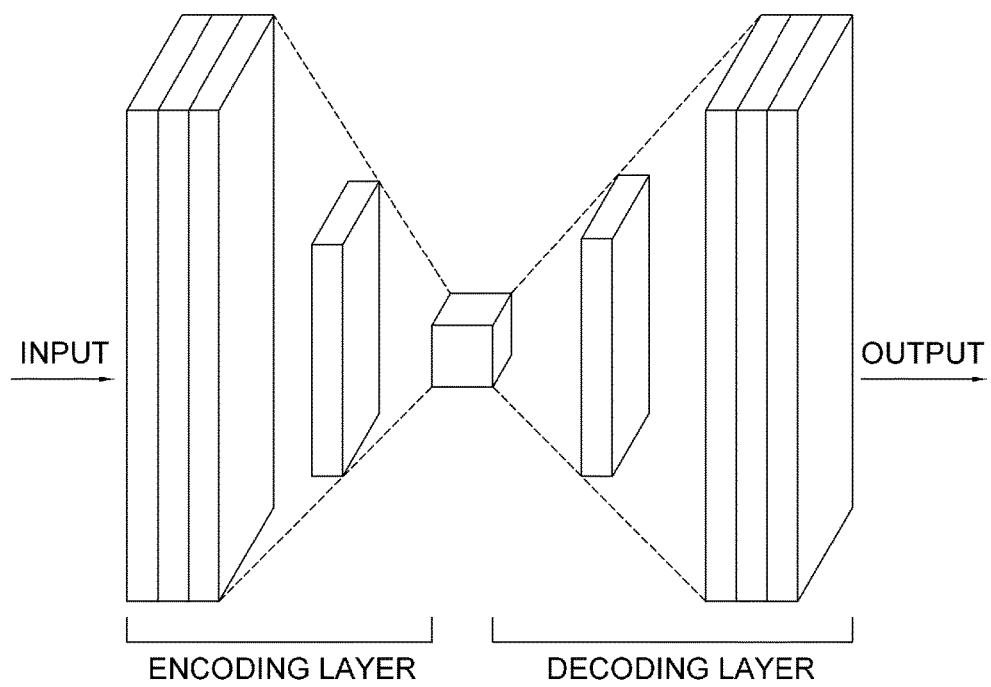
FIG. 2 is a drawing schematically illustrating a first transformer and a second transformer for transforming the real images into the virtual images by using the cycle GAN in accordance with one example embodiment of the present disclosure.

FIG. 2 is a drawing schematically illustrating a first transformer and a second transformer for transforming the real images into the virtual images by using a cycle GAN in accordance with one example embodiment of the present disclosure.

The first transformer 130 and the second transformer 150 may include at least part of one or more encoding layers and one or more decoding layers. The encoding layers may apply one or more convolution operations to its inputted image, to thereby generate at least one feature map, and the decoding layers may apply one or more deconvolution operations to the feature map, to thereby generate an image with transformed characteristics. As such, each of the transformers may perform transformations of each direction, a direction of from the real images to images whose characteristics are same as or similar to those of the virtual images, or a direction of from the virtual images to images whose characteristics are same as or similar to those of the real images. The first discriminator 140 and the second discriminator 160 may determine whether the input image fed thereinto is an image with the transformed characteristics or an image with untransformed characteristics. Specifically, the first discriminator 140 may determine whether the input image fed thereinto is one of primary virtual images or one of secondary virtual images, to thereby output 1 if the former is the case and 0 if the latter is the case. Herein, the primary virtual images are at least part of the virtual images without a transformation from at least part of the real images, and the secondary virtual images are at least part of the virtual images with the transformation from at least part of the real images. Also, the second discriminator 160 may determine whether the input image fed thereinto is one of primary real images or one of secondary real images, to thereby output 1 if the former is the case and 0 if the latter is the case. Herein, the primary real images are at least part of the real images without a transformation from at least part of the virtual images, and the secondary real images are at least part of the real images with the transformation from at least part of the virtual images. Also, the first discriminator 140 and the second discriminator 160 may be comprised of one or more CNNs, but the scope of the present disclosure is not limited thereto.

Further, the virtual object detector 170 may be comprised of one or more CNNs, specifically, may include a convolutional layer and an FC layer. The convolutional layer may apply the convolution operations to the input image fed thereinto, to thereby generate the feature map, and the FC layer may apply a bounding box regression to the feature map, to thereby detect one or more virtual objects. Apparently, the configuration of the virtual object detector 170 is not limited thereto. In one example embodiment, the virtual object detector 170 may have been learned by using the sets of the training images, which are at least part of the virtual images, and their corresponding GTs.

Figure 3:
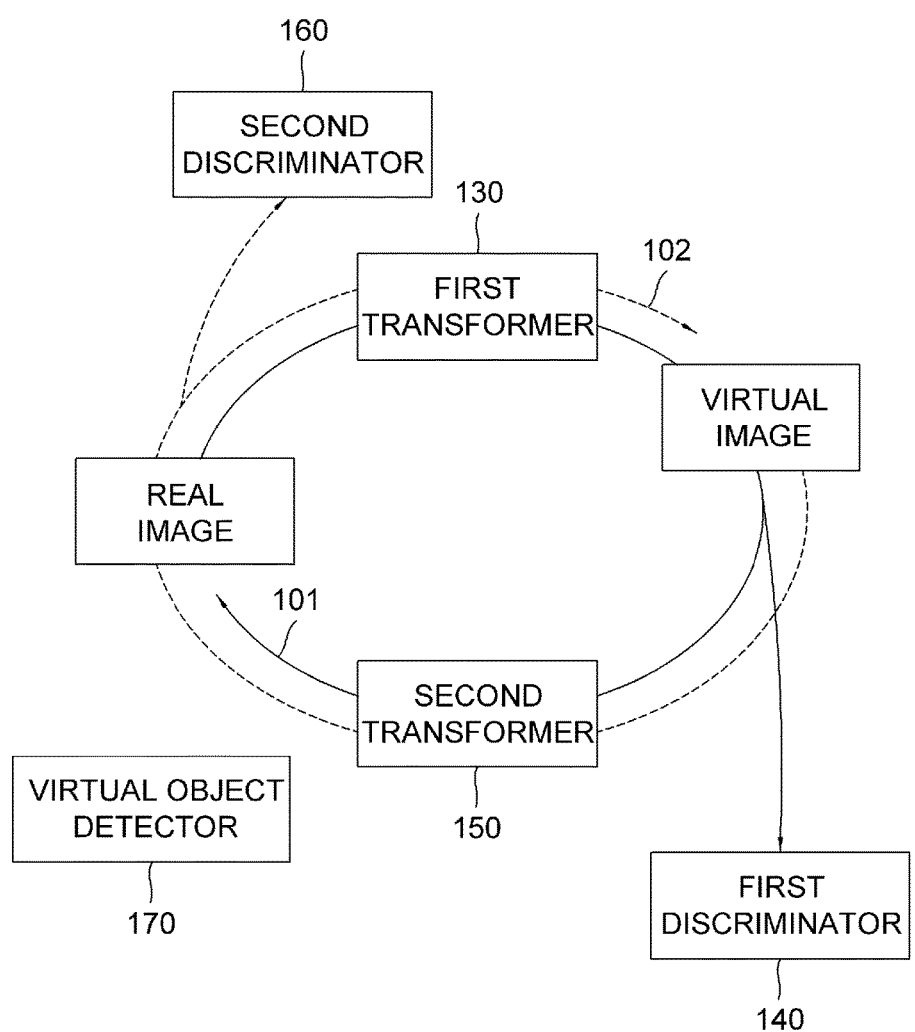
FIG. 3 is a drawing schematically illustrating the learning device for transforming the real images into the virtual images by using the cycle GAN in accordance with one example embodiment of the present disclosure.

The configuration of the learning device 100 for learning the transformation of the one or more real images on the real world into the one or more virtual images on the virtual world by using the cycle GAN in accordance with one example embodiment of the present disclosure is described so far, and the learning method using the learning device 100 in accordance with the present disclosure is described by referring to FIG. 3.

FIG. 3 is a drawing schematically illustrating the learning device for transforming the real images into the virtual images by using the cycle GAN in accordance with one example embodiment of the present disclosure.

By referring to FIG. 3, general operations of the first transformer 130, the first discriminator 140, the second transformer 150, the second discriminator 160, and the virtual object detector 170 are described. There are two major processes, and each of the processes is defined as a forward process 101 and a backward process 102.

In the forward process 101, at least one first image which is one of the real images is transformed into at least one second image whose one or more characteristics are same as or similar to those of the virtual images by the first transformer 130, a 1_1-st result of determining the second image is generated by the first discriminator 140, and the second image is transformed into at least one third image whose one or more characteristics are same as or similar to those of the real images by the second transformer 150. The process of generating the 1_1-st result and the process of transforming the second image into the third image may be performed in a different order or may be performed concurrently.

In the backward process 102, at least one fourth image which is one of the virtual images is transformed into at least one fifth image whose one or more characteristics are same as or similar to those of the real images by the second transformer 150, a 2_1-st result of determining the fifth image is generated by the second discriminator 160, and the fifth image is transformed into at least one sixth image whose one or more characteristics are same as or similar to those of the virtual images again by the first transformer 130. The process of generating the 2_1-st result and the part of transforming the fifth image into the sixth image may be performed in a different order or may be performed concurrently. Additionally, the forward process 101 and the backward process 102 may be performed in a different order or may be performed concurrently.

The purpose of these processes is to calculate one or more losses for better learning of the first transformer 130, the first discriminator 140, the second transformer 150, and the second discriminator 160. The processes of calculating the losses for learning each of components of the learning device 100 will be described in detail.

First, at least one transformer loss to be applied to the first transformer 130 and the second transformer 150 is described as follows.

$$G^* = \mathrm{argmin}(\log(1-D_G(G(I)))+\gamma|I-F(G(I))|+\log(1-D_F(F(X)))+\beta|X-G(F(X))|)$$

The transformer loss included in said one or more losses may be defined by a formula above, and I may be the first image, $G(I)$ may be the second image, $D_G(G(I))$ may be the 1_1-st result, $F(G(I))$ may be the third image, X may be the fourth image, $F(X)$ may be the fifth image, $D_F(F(X))$ may be the 2_1-st result, $G(F(X))$ may be the sixth image, $\gamma$ and $\beta$ may be constants for respectively adjusting weights of $|I-F(G(I))|$ and $|X-G(F(X))|$.

Among the terms as arguments of argmin in the first loss for transformation above, $\log(1-D_G(G(I)))$ may be a term for the learning of the first transformer 130 to make the first discriminator 140 be deceived. That is, the function of argmin makes a resultant final value be decreased and thus also makes $\log(1-D_G(G(I)))$ be decreased. But since the log function is an increasing function, $1-D_G(G(I))$ within the log decreases. That is, $D_G(G(I))$ increases. Since the first discriminator 140 outputs 1 for an image without the transformed format, the term allows the first transformer 130 to learn to deceive the first discriminator 140.

The second term $\gamma|I-F(G(I))|$ may make the transformed image be similar to the original image, that is, may make the second image be similar to the first image. The term is required to reduce a difference from the original, since features in the image may not be conserved if the first transformer 130 learns just to deceive the first discriminator 140. That is, it is for the purpose of reducing I-F(G(I)), i.e., the difference between the first image and the third image. Herein, the difference may mean discrepancy between each of values in the first image and each of its corresponding values in the third image. Due to this second term, the part of transforming the second image into the third image is present in the forward process 101.

The functions of the third and the fourth terms are respectively similar to those of the first term and the second term respectively, and only difference is the third and the fourth terms are used for the second transformer 150. The first transformer 130 will be learned better by the second term if the second transformer 150 is learned better. Values used for the third and the fourth terms may be acquired in the backward process 102. Other details on the third and the fourth terms are similar to those on the first and the second terms and easily inferred from the description above by those skilled in the art, and thus omitted.

Herein, $\gamma$ and $\beta$ in the formula are constants for respectively adjusting weights of $|I-F(G(I))|$ and $|X-G(F(X))|$ as aforementioned, and if the second and the fourth terms have too much influence on the formula then the transformed image appears foggy, and if they have too little influence on the formula then the transformed image does not represent contents of the original image properly. Thus, a programmer may adjust the influence of $|I-F(G(I))|$ and $|X-G(F(X))|$ accordingly by adjusting $\gamma$ and $\beta$.

The transformer loss may further include a partial loss corresponding to the virtual object detection result generated by detector 170. This may be seen in the formula below.

$$G^* = \mathrm{argmin}(\log(1-D_G(G(I)))+\gamma|I-F(G(I))|+\log(1-D_F(F(X)))+\beta|X-G(F(X))|)+\mathrm{argmax}(\lambda_1 \times OD(G(I))+\lambda_2 \times OD(G(F(X))))$$

The terms $\mathrm{argmax}(\lambda_1 \times OD(G(I))+\lambda_2 \times OD(G(F(X))))$ are the partial loss corresponding to the virtual object detection result. Herein, $\lambda_1$ and $\lambda_2$ are constants for respectively adjusting weights of $OD(G(I))$ and $OD(G(F(X)))$. To explain this more specifically, FIG. 4 will be referred to.

Figure 4:
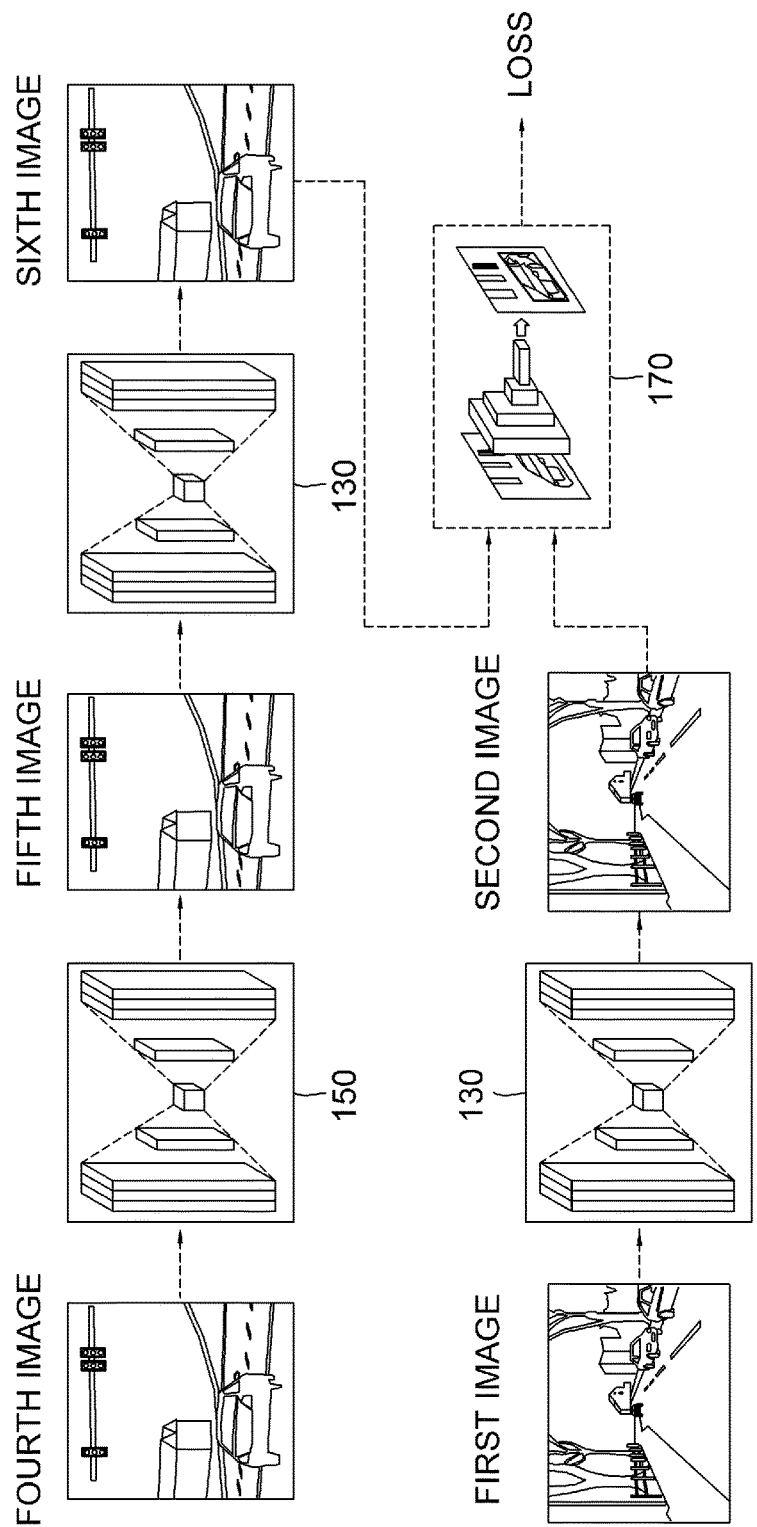
FIG. 4 is a drawing schematically illustrating a process of calculating a partial loss included in a transformer loss in accordance with one example embodiment of the present disclosure.

FIG. 4 is a drawing schematically illustrating a process of calculating the partial loss included in a transformer loss in accordance with one example embodiment of the present disclosure.

By referring to FIG. 4, specific processes of generating the partial loss by using virtual object detection result on the second image and the sixth image generated through the virtual object detector 170. A first part of the specific processes corresponding to the second image may be explained first.

The virtual object detector 170 detects objects included in the second image, and generates each of softmax scores including probabilities of classes to which each of the objects may correspond. A specific part of the partial loss, corresponding to a specific object included in the second image, may be generated by referring to one or more first probabilities and at least one second probability, included in a specific softmax score. Herein, the first probabilities may denote probabilities of the specific object being included in object classes, e.g., a pedestrian class or a vehicle class, and the second probability may denote a probability of the specific object being included in a background class, e.g., a sky class. In one example, the specific part of the partial loss may be selected to allow a sum of (i) a largest probability among the first probabilities and (ii) a difference between 1 and the second probability to be larger. It can be expressed as the formula below.

$$OD(G(I)) = \sum_{i=1,\ldots,R}\left(\max_{j=1,\ldots,L} F\left(C(G(I))_{x_1^{(i)}, x_2^{(i)}, y_1^{(i)}, y_2^{(i)}}\right)_j + \left(1 - F\left(C(G(I))_{x_1^{(i)}, x_2^{(i)}, y_1^{(i)}, y_2^{(i)}}\right)_0\right)\right)$$

In the formula above, $$\max_{j=1,\ldots,L} F\left(C(G(I))_{x_1^{(i)}, x_2^{(i)}, y_1^{(i)}, y_2^{(i)}}\right)_j$$

is the largest probability among the first probabilities, on condition that i is a number denoting the specific object. And, $(1-F(C(G(I))_{x_1^{(i)}, x_2^{(i)}, y_1^{(i)}, y_2^{(i)}})_0)$ is the difference between 1 and the second probability, on condition that 0 is a number denoting the background class. By following the formula above, the first part of the specific processes of generating the partial loss corresponding to the second image may be performed.

In case of the sixth image, a second part of the specific processes of generating the partial loss corresponding to the sixth image may be performed, similarly to the first part.

The partial loss may be included in the transformer loss in order to conserve details of the objects in the image even after the transformation processes. The second and the fourth terms of the formula and the partial loss may function in a complementary way. Specifically, the second term and the fourth term described above allow a transformed image to be similar to an original image corresponding to the transformed image, but this only makes the two images be similar in general, but cannot conserve selectively and preferentially the details of objects included in the original image. In contrary, the partial loss allows the objects included in the original image to be conserved in the transformed image, but it may make new objects, which do not exist in the original image, in the transformed image. However, with the second term and the fourth term, which keeps similarity between the original image and the transformed image, a generation of the unwanted new objects can be prevented. Thus, by adding the partial loss, the first transformer 130 may be significantly optimized.

The transformer loss have been explained so far. Below, processes of calculating loss for discriminators will be explained below.

$$D_G{}^* = \mathrm{argmax}(\log(D_G(VI)) + \log(1 - D_G(G(I))))$$

An FD loss, which is a loss for the first discriminator 140 is defined by a formula above. Herein, VI is any arbitrary virtual image among the virtual images, $D_G(VI)$ is a 1_2-nd result, from the first discriminator, of determining the arbitrary virtual image, $G(I)$ is the second image, and $D_G(G(I))$ is the 1_1-st result. Argmax makes the whole resultant value increase, makes $D_G(VI)$ be outputted as 1, and makes $D_G(G(I))$ be outputted as 0. Therefore the first discriminator 140 may determine correctly whether characteristics of the inputted image were previously transformed or not. In FIG. 4, a process of inputting only the second image is shown, but the inputted image is not limited to an image whose characteristics were transformed like the second image, and any arbitrary image, which is one of the virtual images, may be inputted. Thus an image with the transformed characteristics and an image with the untransformed characteristics may be used for learning with discernment.

$$D_F{}^* = \mathrm{argmax}(\log(D_F(RI)) + \log(1 - D_F(F(X))))$$

An SD loss, which is a loss for the second discriminator 160 is defined by a formula above. Herein, RI is any arbitrary real image among the real images, $D_F(RI)$ is a 2_2-nd result, from the second discriminator, of determining the arbitrary real image, $F(X)$ is the fifth image, and $D_F(F(X))$ is the 2_1-st result. Similar to the FD loss, it makes the second discriminator 160 to determine correctly whether characteristics of the inputted image were previously transformed or not. Also, any arbitrary image, which is one of the real images, may be inputted and used for the learning processes.

If said one or more losses including the transformer loss, the FD loss for the first discriminator, and the SD loss for the second discriminator may be calculated, the learning device 100 may learn at least part of parameters of the first transformer 130, the first discriminator 140, the second transformer 150, and the second discriminator 160.

In the learning processes, generally, the encoding layers and the decoding layers included in the first transformer 130 and the second transformer 150 may be learned separately, with no relationship therebetween. Different from the general ones, layers included in the first transformer 130 and the second transformer 150 may be learned relatedly. Below, related learning processes will be explained.

Specifically, there may be first parameters included in (i) one or more first specific encoding layers, which are at least part of first encoding layers included in the first transformer 130, and (ii) one or more first specific decoding layers, which are at least part of first decoding layers included in the first transformer 130. Also, there may be second parameters included in (i) one or more second specific encoding layers, which are at least part of second encoding layers included in the second transformer 150, and (ii) one or more second specific decoding layers, which are at least part of second decoding layers included in the second transformer 150.

Then, at least part of the first parameters and at least part of the second parameters may be learned relatedly such that a degree of relationship between the first parameters and the second parameters is allowed to be larger than a threshold value. Herein, the degree of the relationship may denote a ratio of same values included in the first parameters and their corresponding second parameters. In one example, at least part of the first parameters may be learned same as their corresponding second parameters.

Herein, the first specific encoding layers and the first specific decoding layers may be selected among the first encoding layers and the first decoding layers respectively such that one or more first distances from a first latent space are smaller than a first threshold distance. Herein, the first latent space is where a first feature map generated by the first encoding layers lies, located between the first encoding layer and the first decoding layers.

The second specific encoding layers and the second specific decoding layers are selected among the second encoding layers and the second decoding layers respectively such that one or more second distances from a second latent space, located between the second encoding layer and the second decoding layers, are smaller than a second threshold distance.

This kind of approach may optimize the transforming process because parameters in layers close to the latent spaces include much information on contents of images inputted to the transformers, so that robust information acquired from both of the real images and the virtual images may be reflected on related parameters.

Thanks to such a learning, the first transformer 130 may conserve or nearly keep the contents of the image while transforming its characteristics.

The learning process is described above, the testing processes after completion of the learning process are described as below.

For reference, in the description below, the phrase "for training" or "training" is added for terms related to the learning processes, and the phrase "for testing" or "testing" is added for terms related to the testing processes, to avoid possible confusion.

First, on condition that (1) the learning device 100, if at least one first training image, which is one of the real images, is acquired, (i) has instructed the first transformer 130 to transform the first training image to at least one second training image, whose one or more characteristics are same as or similar to those of the virtual images, (ii-1) has instructed the first discriminator 140 to determine whether the second training image is one of the primary virtual images or one of the secondary virtual images, wherein the primary virtual images are at least part of the virtual images without a transformation from at least part of the real images, and the secondary virtual images are at least part of the virtual images with the transformation from at least part of the real images, to thereby generate the 1_1-st result, and (ii-2) has instructed the second transformer 150 to transform the second training image to at least one third training image, whose one or more characteristics are same as or similar to those of the real images; (2) the learning device 100, if at least one fourth training image, which is one of the virtual images, is acquired, (i) has instructed the second transformer 150 to transform the fourth training image to at least one fifth training image, whose one or more characteristics are same as or similar to those of the real images, (ii-1) has instructed the second discriminator 160 to determine whether the fifth training image is one of the primary real images or one of the secondary real images, wherein the primary real images are at least part of the real images without a transformation from at least part of the virtual images, and the secondary real images are at least part of the real images with the transformation from at least part of the virtual images, to thereby generate the 2_1-st result, and (ii-2) has instructed the first transformer 130 to transform the fifth training image to at least one sixth training image, whose one or more characteristics are same as or similar to those of the virtual images; (3) the learning device 100 has calculated one or more losses by referring to at least part of the first training image, the second training image, the third training image, the fourth training image, the fifth training image, the sixth training image, the 1_1-st result, and the 2_1-st result, to thereby learn at least part of parameters of the first transformer, the second transformer, the first discriminator, and the second discriminator, a testing device may instruct the first transformer 130 to acquire at least one test image, which is one of the real images. After, the testing device may instruct the first transformer 130 to transform the test image into at least one transformed test image, whose one or more characteristics are same as or similar to those of the virtual images.

The testing device may include configurations of the learning device 100 described in the FIG. 1, except the second transformer 150, the first discriminator 140 and the second discriminator 160.

Meanwhile, even though the virtual object detector 170 have been learned before the learning processes and the testing processes of the first transformer 130, parameters included in the virtual object detector 170 may be fine-tuned by further using transformed images for fine-tuning and their corresponding GTs. The fine-tuning processes may be similar to the learning processes of the first transformer 130, thus omitted. However, this process may not be essential in practicing the present disclosure.

After, the testing device including the virtual object detector 170 and the first transformer 130 may support an autonomous vehicle. Specifically, if the test images, which are at least part of the real images, are acquired by a camera included in the autonomous vehicle, the testing device 100 may instruct the first transformer to transform the test images into transformed test images, and instruct the virtual object detector 170 to detect objects included in the transformed test images, whose characteristics are same as or similar to those of virtual images, to thereby support driving of the autonomous vehicle in the real world.

Thanks to such a testing, the virtual object detector 170, learned by using information on the virtual world, may be used for driving of an autonomous vehicle in the real world.

It is a positive effect of the present disclosure to provide a method for allowing object detectors learned by using the virtual images on the virtual world to detect objects included in the real images on the real world by transforming the real images into the virtual images through a transformer having been learned by using GAN.

As can be understood by those skilled in the art, it is clear that communication parts of the learning device and the testing device may perform transmission of image data, for example, images described above like the original image, original labels, and additional labels, etc., and that processors and/or memories of the learning device and the testing device may retain data for feature maps and performing operations, and that the processors of the learning device and the testing device may perform convolution operations, deconvolution operations, and loss value operations, but the scope of the present disclosure is not limited thereto.

The present disclosure has an effect of alleviating a problem of procuring the sets of the training images in the non-RGB format by transforming the sets of the training images in the RGB format into those in the non-RGB format with a cycle GAN (Generative Adversarial Network) capable of being applied to domain adaptation.

Thus, the method in accordance with the present disclosure can be performed to be used in virtual driving environments by using a runtime input transformation. Further, a gap between virtuality and reality, and annotation costs can be reduced by the method.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A learning method for learning transformation of one or more real images on a real world into one or more virtual images on a virtual world by using a cycle GAN (Generative Adversarial Network), comprising steps of:
   (a) a learning device, if at least one first image, which is one of the real images, is acquired, (i) instructing a first transformer to transform the first image to at least one second image, whose one or more characteristics are same as or similar to those of the virtual images, (ii-1) instructing a first discriminator to determine whether the second image is one of primary virtual images or one of secondary virtual images, wherein the primary virtual images are at least part of the virtual images without a transformation from at least part of the real images, and the secondary virtual images are at least part of the virtual images with the transformation from at least part of the real images, to thereby generate a 1_1-st result, and (ii-2) instructing a second transformer to transform the second image to at least one third image, whose one or more characteristics are same as or similar to those of the real images;

(b) the learning device, if at least one fourth image, which is one of the virtual images, is acquired, (i) instructing the second transformer to transform the fourth image to at least one fifth image, whose one or more characteristics are same as or similar to those of the real images, (ii-1) instructing a second discriminator to determine whether the fifth image is one of primary real images or one of secondary real images, wherein the primary real images are at least part of the real images without a transformation from at least part of the virtual images, and the secondary real images are at least part of the real images with the transformation from at least part of the virtual images, to thereby generate a 2_1-st result, and (ii-2) instructing the first transformer to transform the fifth image to at least one sixth image, whose one or more characteristics are same as or similar to those of the virtual images; and (c) the learning device calculating one or more losses by referring to at least part of the first image, the second image, the third image, the fourth image, the fifth image, the sixth image, the 1_1-st result, and the 2_1-st result, to thereby learn at least part of parameters of the first transformer, the second transformer, the first discriminator, and the second discriminator.

2. The learning method of claim 1, wherein, at the step of (c), $$G^* = \mathrm{argmin}(\log(1-D_G(G(I))) + \gamma |I-F(G(I))| + \log(1-D_F(F(X))) + \beta |X-G(F(X))|)$$

a transformer loss included in said one or more losses is defined by a formula above, I is the first image, $G(I)$ is the second image, $D_G(GM)$ is the 1_1-st result, $F(G(I))$ is the third image, X is the fourth image, $F(X)$ is the fifth image, $D_F(F(X))$ is the 2_1-st result, $G(F(X))$ is the sixth image, $\gamma$ and $\beta$ are constants for adjusting each of weights of each of $|I-F(G(I))|$ and $|X-G(F(X))|$.

3. The learning method of claim 1, wherein, at the step of (c), the learning device, if (i) a virtual object detection result on at least part of the second image and the sixth image generated by a virtual object detector, which detects at least one virtual object included in its inputted image, and (ii) its corresponding GT are acquired, instructs a loss unit to generate at least part of said one or more losses by further referring to the virtual object detection result.

4. The learning method of claim 3, wherein, at the step of (c), $$G^* = \mathrm{argmin}(\log(1-D_G(G(I))) + \gamma |I-F(G(I))| + \log(1-D_F(F(X))) + \beta |X-G(F(X))| + \mathrm{argmax}(\lambda_1 \times OD(G(I)) + \lambda_2 \times OD(G(F(X)))))$$

a transformer loss included in said one or more losses is defined by a formula above, I is the first image, $G(I)$ is the second image, $D_G(G(I))$ is the 1_1-st result, $F(G(I))$ is the third image, X is the fourth image, $F(X)$ is the fifth image, $D_F(F(X))$ is the 2_1-st result, $G(F(X))$ is the sixth image, $\gamma$ and $\beta$ are constants for adjusting each of weights of each of $|I-F(G(I))|$ and $|X-G(F(X))|$, and $\mathrm{argmax}(\lambda_1 \times OD(G(I)) + \lambda_2 \times OD(G(F(X))))$ is a partial loss of the transformer loss, corresponding to the virtual object detection result, $\lambda_1$ and $\lambda_2$ are constants for adjusting each of weights of each of $OD(G(I))$ and $OD(G(F(X)))$.

5. The learning method of claim 1, wherein, at the step of (c), $$D_G^* = \mathrm{argmax}(\log(D_G(VI)) + \log(1-D_G(G(I))))$$

an FD loss for the first discriminator included in the losses is defined by a formula above, VI is any arbitrary virtual image among the virtual images, $D_G(VI)$ is a 1_2-nd result, from the first discriminator, of determining the arbitrary virtual image, $G(I)$ is the second image, and $D_G(G(I))$ is the 1_1-st result.

6. The learning method of claim 1, wherein, at the step of (c), $$D_F^* = \mathrm{argmax}(\log(D_F(RI)) + \log(1-D_F(F(X))))$$

an SD loss for the second discriminator included in the losses is defined by a formula above, RI is any arbitrary real image among the real images, $D_F(RI)$ is a 2_2-nd result, from the second discriminator, of determining the arbitrary real image, $F(X)$ is the fifth image, and $D_F(F(X))$ is the 2_1-st result.

7. The learning method of claim 1, wherein each of the first transformer and the second transformer includes at least part of one or more encoding layers and one or more decoding layers.

8. The learning method of claim 7, wherein (i) at least part of first parameters included in (i-1) one or more first specific encoding layers, which are at least part of first encoding layers included in the first transformer and (i-2) one or more first specific decoding layers, which are at least part of first decoding layers included in the first transformer, and (ii) at least part of second parameters included in (ii-1) one or more second specific encoding layers, which are at least part of second encoding layers included in the second transformer and (ii-2) one or more second specific decoding layers, which are at least part of second decoding layers included in the second transformer, are learned relatedly, to thereby allow a degree of relationship between the first parameters and the second parameters to be larger than a threshold value.

9. The learning method of claim 8, wherein the first specific encoding layers and the first specific decoding layers are selected among the first encoding layers and the first decoding layers respectively such that one or more first distances from a first latent space, located between the first encoding layer and the first decoding layers, are smaller than a first threshold distance, and the second specific encoding layers and the second specific decoding layers are selected among the second encoding layers and the second decoding layers respectively such that one or more second distances from a second latent space, located between the second encoding layer and the second decoding layers, are smaller than a second threshold distance.

10. A testing method for testing transformation of one or more real images for testing on a real world into one or more virtual images for testing on a virtual world by using a cycle GAN (Generative Adversarial Network), comprising a step of:

on condition that (1) a learning device (i) has instructed a first transformer to transform at least one first training image, which is one of real images for training, to at least one second training image, whose one or more characteristics are same as or similar to those of one or more virtual images for training, (ii-1) has instructed a first discriminator to determine whether the second training image is one of primary virtual images or one of secondary virtual images, wherein the primary virtual images are at least part of the virtual images for training without a transformation from at least part of the real images for training, and the secondary virtual images are at least part of the virtual images for training with the transformation from at least part of the real images for training, to thereby generate a 1_1-st result, and (ii-2) has instructed a second transformer to transform the second training image to at least one third training image, whose one or more characteristics are same as or similar to those of the real images for training, (2) the learning device (i) has instructed the second transformer to transform at least one fourth training image, which is one of the virtual images for training, to at least one fifth training image, whose one or more characteristics are same as or similar to those of the real images for training, (ii-1) has instructed a second discriminator to determine whether the fifth training image is one of primary real images or one of secondary real images, wherein the primary real images are at least part of the real images for training without a transformation from at least part of the virtual images for training, and the secondary real images are at least part of the real images for training with the transformation from at least part of the virtual images for training, to thereby generate a 2_1-st result, and (ii-2) has instructed the first transformer to transform the fifth training image to at least one sixth training image, whose one or more characteristics are same as or similar to those of the virtual images for training, and (3) the learning device has calculated one or more losses by referring to at least part of the first training image, the second training image, the third training image, the fourth training image, the fifth training image, the sixth training image, the 1_1-st result, and the 2_1-st result, to thereby learn at least part of parameters of the first transformer, the second transformer, the first discriminator, and the second discriminator; a testing device instructing the first transformer to acquire at least one test image, which is one of the real images for testing, and to transform the test image into at least one transformed test image, whose one or more characteristics are same as or similar to those of the virtual images for testing.

11. The testing method of claim 10, wherein the transformed test image is used for fine-tuning of parameters included in a virtual object detector.

12. The testing method of claim 10, wherein the test image is one of the real images for testing acquired by a camera included in an autonomous vehicle, and a virtual object detector included in the autonomous vehicle detects at least one object included in the transformed test image to thereby support the autonomous vehicle to drive in the real world.

13. A learning device for learning transformation of one or more real images on a real world into one or more virtual images on a virtual world by using a cycle GAN (Generative Adversarial Network), comprising:
at least one memory that stores instructions; and
at least one processor configured to execute the instructions to: perform processes of (I), if at least one first image, which is one of the real images, is acquired, (i) instructing a first transformer to transform the first image to at least one second image, whose one or more characteristics are same as or similar to those of the virtual images, (ii-1) instructing a first discriminator to determine whether the second image is one of primary virtual images or one of secondary virtual images, wherein the primary virtual images are at least part of the virtual images without a transformation from at least part of the real images, and the secondary virtual images are at least part of the virtual images with the transformation from at least part of the real images, to thereby generate a 1_1-st result, and (ii-2) instructing a second transformer to transform the second image to at least one third image, whose one or more characteristics are same as or similar to those of the real images, (II) if at least one fourth image, which is one of the virtual images, is acquired, (i) instructing the second transformer to transform the fourth image to at least one fifth image, whose one or more characteristics are same as or similar to those of the real images, (ii-1) instructing a second discriminator to determine whether the fifth image is one of primary real images or one of secondary real images, wherein the primary real images are at least part of the real images without a transformation from at least part of the virtual images, and the secondary real images are at least part of the real images with the transformation from at least part of the virtual images, to thereby generate a 2_1-st result, and (ii-2) instructing the first transformer to transform the fifth image to at least one sixth image, whose one or more characteristics are same as or similar to those of the virtual images, and (III) calculating one or more losses by referring to at least part of the first image, the second image, the third image, the fourth image, the fifth image, the sixth image, the 1_1-st result, and the 2_1-st result, to thereby learn at least part of parameters of the first transformer, the second transformer, the first discriminator, and the second discriminator.

14. The learning device of claim 13, wherein, at the process of (III), $$G^* = \mathrm{argmin}(\log(1-D_G(G(I))) + \gamma |I - F(G(I))| + \log(1-D_F(F(X))) + \beta |X - G(F(X))|)$$

a transformer loss included in said one or more losses is defined by a formula above, I is the first image, G(I) is the second image, $D_G(G(I))$ is the 1_1–st result, F(G(I)) is the third image, X is the fourth image, F(X) is the fifth image, $D_F(F(X))$ is the 2_1-st result, G(F(X)) is the sixth image, γ and β are constants for adjusting each of weights of each of |I−F(G(I))| and |X−G(F(X))|.

15. The learning device of claim 13, wherein, at the process of (III), the processor, if (i) a virtual object detection result on at least part of the second image and the sixth image generated by a virtual object detector, which detects at least one virtual object included in its inputted image, and (ii) its corresponding GT are acquired, instructs a loss unit to generate at least part of said one or more losses by further referring to the virtual object detection result.

16. The learning device of claim 15, wherein, at the process of (III), $$G^* = \mathrm{argmin}(\log(1-D_G(G(I))) + \gamma |I - F(G(I))| + \log(1-D_F(F(X))) + \beta |X - G(F(X))|) + \mathrm{argmax}(\lambda_1 \times OD(G(I)) + \lambda_2 \times OD(G(F(X))))$$

a transformer loss included in said one or more losses is defined by a formula above, I is the first image, G(I) is the second image, $D_G(G(I))$ is the 1_1-st result, F(G (I)) is the third image, X is the fourth image, F(X) is the fifth image, $D_F(F(X))$ is the 2_1-st result, G(F(X)) is the sixth image, γ and β are constants for adjusting each of weights of each of |I−F(G(I))| and |X−G(F(X))|, and argmax($\lambda_1$×OD(G(I))+$\lambda_2$×OD (G(F(X)))) is a partial loss of the transformer loss, corresponding to the virtual object detection result, $\lambda_1$ and $\lambda_2$ are constants for adjusting each of weights of each of OD(G(I)) and OD (G(F(X))).

17. The learning device of claim 13, wherein, at the process of (III), $$D_G^* = \text{argmax}(\log(D_G(VI)) + \log(1 - D_G(G(I))))$$

an FD loss for the first discriminator included in the losses is defined by a formula above, VI is any arbitrary virtual image among the virtual images, $D_G(VI)$ is a 1_2-nd result, from the first discriminator, of determining the arbitrary virtual image, G(I) is the second image, and $D_G(G(I))$ is the 1_1-st result.

18. The learning device of claim 13, wherein, at the process of (III), $$D_F^* = \text{argmax}(\log(D_F(RI)) + \log(1 - D_F(F(X))))$$

an SD loss for the second discriminator included in the losses is defined by a formula above, RI is any arbitrary real image among the real images, $D_F(RI)$ is a 2_2-nd result, from the second discriminator, of determining the arbitrary real image, F(X) is the fifth image, and $D_F(F(X))$ is the 2_1-st result.

19. The learning device of claim 13, wherein each of the first transformer and the second transformer includes at least part of one or more encoding layers and one or more decoding layers.

20. The learning device of claim 19, wherein (i) at least part of first parameters included in (i-1) one or more first specific encoding layers, which are at least part of first encoding layers included in the first transformer and (i-2) one or more first specific decoding layers, which are at least part of first decoding layers included in the first transformer, and (ii) at least part of second parameters included in (ii-1) one or more second specific encoding layers, which are at least part of second encoding layers included in the second transformer and (ii-2) one or more second specific decoding layers, which are at least part of second decoding layers included in the second transformer, are learned relatedly, to thereby allow a degree of relationship between the first parameters and the second parameters to be larger than a threshold value.

21. The learning device of claim 20, wherein the first specific encoding layers and the first specific decoding layers are selected among the first encoding layers and the first decoding layers respectively such that one or more first distances from a first latent space, located between the first encoding layer and the first decoding layers, are smaller than a first threshold distance, and the second specific encoding layers and the second specific decoding layers are selected among the second encoding layers and the second decoding layers respectively such that one or more second distances from a second latent space, located between the second encoding layer and the second decoding layers, are smaller than a second threshold distance.

22. A testing device for testing transformation of one or more real images for testing on a real world into one or more virtual images for testing on a virtual world by using a cycle GAN (Generative Adversarial Network), comprising:

at least one memory stores instructions; and
at least one processor, on condition that a learning device, (1) (i) has instructed a first transformer to transform at least one first training image, which is one of real images for training, to at least one second training image, whose one or more characteristics are same as or similar to those of one or more virtual images for training, (ii-1) has instructed a first discriminator to determine whether the second training image is one of primary virtual images or one of secondary virtual images, wherein the primary virtual images are at least part of the virtual images for training without a transformation from at least part of the real images for training and the secondary virtual images are at least part of the virtual images for training with the transformation from at least part of the real images for training, to thereby generate a 1_1-st result, and (ii-2) has instructed a second transformer to transform the second training image to at least one third training image, whose one or more characteristics are same as or similar to those of the real images for training, (2) the learning device (i) has instructed the second transformer to transform at least one fourth training image, which is one of the virtual images for training, to at least one fifth training image, whose one or more characteristics are same as or similar to those of the real images for training, (ii-1) has instructed a second discriminator to determine whether the fifth training image is one of primary real images or one of secondary real images, wherein the primary real images are at least part of the real images for training without a transformation from at least part of the virtual images for training and the secondary real images are at least part of the real images for training with the transformation from at least part of the virtual images for training to thereby generate a 2_1-st result, and (ii-2) has instructed the first transformer to transform the fifth training image to at least one sixth training image, whose one or more characteristics are same as or similar to those of the virtual images for training and (3) the learning device has calculated one or more losses by referring to at least part of the first training image, the second training image, the third training image, the fourth training image, the fifth training image, the sixth training image, the 1_1-st result, and the 2_1-st result, to thereby learn at least part of parameters of the first transformer, the second transformer, the first discriminator, and the second discriminator; configured to execute the instructions to: perform a process of instructing the first transformer to acquire at least one test image, which is one of the real images for testing, and instructing the first transformer to transform the test image into at least one transformed test image, whose one or more characteristics are same as or similar to those of the virtual images for testing.

23. The testing device of claim 22, wherein the transformed test image is used for fine-tuning of parameters included in a virtual object detector.

24. The testing device of claim 22, wherein the test image is one of the real images for testing acquired by a camera included in an autonomous vehicle, and a virtual object detector included in the autonomous vehicle detects at least one object included in the transformed test image to thereby support the autonomous vehicle to drive in the real world.

* * * * *

UNITED STATES PATENT AND TRADEMARK OFFICE
CERTIFICATE OF CORRECTION

PATENT NO. : 10,373,023 B1
APPLICATION NO. : 16/258877
DATED : August 6, 2019
INVENTOR(S) : Kye-Hyeon Kim Page 1 of 1

It is certified that error appears in the above-identified patent and that said Letters Patent is hereby corrected as shown below:

In the Claims

Column 17, Line 41, Claim 2 the portion of the formula reading:

$-(\log(1 - D_G(G(I)))-$

Should read:
-- $(\log(1 - D_G(G(I))))$ --

Column 17, Line 45, Claim 2 the formula reading:

$- D_G(G(M)) -$

Should read:
-- $D_G(G(I)))$ --

Signed and Sealed this
Twenty-fourth Day of September, 2019

Andrei Iancu
*Director of the United States Patent and Trademark Office*